US011909097B2

(12) United States Patent
Vemagiri

(10) Patent No.: US 11,909,097 B2
(45) Date of Patent: Feb. 20, 2024

(54) MONOLITHIC ANTENNA INTEGRATED RADIO FREQUENCY CONNECTOR

(71) Applicant: Corning Optical Communications RF LLC, Glendale, AZ (US)

(72) Inventor: Jeevan Kumar Vemagiri, Peoria, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 280 days.

(21) Appl. No.: 17/324,075

(22) Filed: May 18, 2021

(65) Prior Publication Data

US 2021/0273313 A1 Sep. 2, 2021

Related U.S. Application Data

(63) Continuation of application No. PCT/US2019/061925, filed on Nov. 18, 2019.

(60) Provisional application No. 62/769,793, filed on Nov. 20, 2018.

(51) Int. Cl.

| | |
|---|---|
| ***H01Q 1/22*** | (2006.01) |
| ***H01Q 13/10*** | (2006.01) |
| ***H01Q 21/28*** | (2006.01) |
| ***H01R 13/627*** | (2006.01) |
| ***H01R 24/40*** | (2011.01) |

(52) U.S. Cl.

CPC ............... *H01Q 1/22* (2013.01); *H01Q 13/10* (2013.01); *H01Q 21/28* (2013.01); *H01R 13/6271* (2013.01); *H01R 24/40* (2013.01); *H01R 2201/02* (2013.01)

(58) Field of Classification Search

CPC .......... H01Q 1/22; H01Q 13/10; H01Q 21/28; H01R 2201/02

See application file for complete search history.

(56) References Cited

U.S. PATENT DOCUMENTS

| | | | |
|---|---|---|---|
| 5,274,393 | A | 12/1993 | Scott |
| 6,717,551 | B1 | 4/2004 | Desclos et al. |
| 7,961,148 | B2 | 6/2011 | Goldberger |

(Continued)

FOREIGN PATENT DOCUMENTS

| | | | |
|---|---|---|---|
| KR | 10-2007-0017088 | A | 2/2007 |
| TW | 200723589 | A | 6/2007 |
| TW | 201143200 | A | 12/2011 |

OTHER PUBLICATIONS

Taiwanese Patent Application No. 108142107, Office Action dated Mar. 31, 2023, 2 pages (English Translation Only); Taiwanese Patent Office.

(Continued)

*Primary Examiner* — Graham P Smith
(74) *Attorney, Agent, or Firm* — Tamika A. Crawl-Bey

(57) ABSTRACT

An integrated connector-antenna assembly is provided, wherein an antenna is monolithically integrated with a radio frequency (RF) connector housing. The connector-antenna assembly may also include the RF signal element, wherein the connector center pin is monolithically integrated to the connector housing. Although part of the connector-antenna assembly, the connector housing and connector signal element still serve the connector function, which is essentially a channel for RF signal from the RF signal source to the antenna.

14 Claims, 5 Drawing Sheets

(56) References Cited

U.S. PATENT DOCUMENTS

| | | | | |
|---|---|---|---|---|
| 2008/0261546 | A1 | 10/2008 | Mellage et al. | |
| 2010/0194651 | A1 | 8/2010 | Huang | |
| 2012/0188138 | A1 | 7/2012 | Liu | |
| 2018/0166768 | A1 * | 6/2018 | Van Cleave | H01Q 1/3291 |

OTHER PUBLICATIONS

Donald W. Griffin, "Monolithic active array limitations due to substrate modes" , IEEE Antennas and Propagation Society International Symposium. 1995 , vol. 2, pp. 1300-1303.
Griffin et al., "Electromagnetic Design Aspects of Packages for Phased Array Modules that may Incorporate Monolithic Antenna Elements", IEEE Antennas and Propagation Society International Symposium. vol. 2, 1993 International Symposium Digest Antennas and Propagation, pp. 986-989.
Hettak et al., "A novel integrated antenna for millimeter-wave personal communications systems", IEEE Transactions on Antennas and Propagation, vol. 46, No. 11, Nov. 1998, pp. 1757-1758.
International Search Report and Written Opinion of the International Searching Authority; PCT/US19/61925; dated Mar. 11, 2020; 7 Pages; Korean Intellectual Property Office.

* cited by examiner

MONOLITHIC ANTENNA INTEGRATED RADIO FREQUENCY CONNECTOR

CROSS-REFERENCE TO RELATED APPLICATIONS

This application is a continuation of International Application No. PCT/US2019/061925, filed Nov. 18, 2019, which claims the benefit of priority to U.S. Provisional Application Ser. No. 62/769,793, filed Nov. 20, 2018, both applications being incorporated herein by reference in their entirety.

BACKGROUND

The present disclosure generally relates to connector-antenna assemblies, and particularly connector assemblies including monolithic antenna integrated radio frequency connectors.

An antenna is typically connected to a transmitter or receiver with a radio frequency (RF) connector. The RF connector and the antenna are designed and manufactured as separate components to meet unique end goals. The RF connector is designed to pass or channel an RF signal or guided electromagnetic wave from a first end (port 1) of the RF connector to a second end (port 2) of the RF connector. The antenna is designed to convert the RF signal or guided electromagnetic wave traveling in a Transverse Electromagnetic (TEM) wave guide (such as a RF connector) to an unguided wave over the air medium.

In some applications, the RF connector may be used between two printed circuit boards (PCBs) or between a PCB and an external unit, such as the antenna. For example, one end of the RF connector may be mechanically connected to an input/output (I/O) port of the PCB and the other end of the RF connector may be mechanically connected to an I/O port of the antenna. In some instances, the connector housing may be mechanically connected by solder or by means of screws to a dipole arm (negative or positive potential) of the antenna. The signal pin of the connector may be connected by solder or by a socket/pin mechanism to mate with the other arm (positive or negative potential) of the dipole. When the RF connector is mechanically connected to the antenna, manufacturers must determine and assess parasitic (unwanted) inductances and capacitances at the junction or interface between the connector and the antenna. Such parasitic inductances and capacitances at the junction are best determined and assessed by design and modeling methodologies or experimental trial and error methodologies, all of which are costly and time consuming.

For cost and space savings, some antennas may be monolithically integrated into the PCB circuitry. To have electrical impedance continuity across the mechanical junctions between the connector and antenna or the connector and PCB, on the electrical design front, the junction design is optimized so as to minimize the junction reflection losses. However, these design optimizations do not effectively eliminate junction reflection and insertion losses, especially at high mmWave frequencies where the effect of parasitic inductances and capacitances have a more significant effect higher in GHz frequency. Consider that the junction parasitic inductances and capacitances create a deviation from the needed 50 ohm characteristic impedance in the signal path from the connector to the antenna, through the connector-antenna junction. Deviations in the characteristic impedance imply signal reflection and transmission losses. Considering further that the compensation techniques employed to overcome these parasitic inductances and capacitances are limited due to space and cost constraints, the ideal performance of a 50 ohm transmission line channel is degraded.

SUMMARY

Embodiments are directed to an integrated connector-antenna assembly, wherein an antenna is monolithically integrated with a radio frequency (RF) connector housing. In some embodiments, the connector-antenna assembly may also include the RF signal element, wherein the connector center pin is monolithically integrated to the connector housing. Although part of the connector-antenna assembly, the connector housing and connector signal element still serve the connector function, which is essentially a channel for RF signal from the RF signal source (for example, a signal generator or amplifier) to the antenna.

Embodiments eliminate the need for mechanical connections between the RF connector and antenna and take advantage of the physics of separation of charges at high frequencies to eliminate an electrical short and create not just a monolithic connector housing and antenna unit but also a monolithic connector housing, antenna, and connector signal unit. Embodiments thus eliminate performance degradation by essentially eliminating the interface between the connector and the antenna.

Some embodiments are thus directed to a connector-antenna assembly comprising a connector housing configured to function as a radio frequency connector. The length of the connector housing is determined based on an antenna form factor. The connector-antenna assembly also includes an antenna integrated with and formed from the connector housing.

Embodiments are also directed to a connector-antenna assembly comprising a connector housing integrated with a connector signal element and configured to function as a radio frequency connector. The length of the connector housing is determined based on an antenna form factor. The connector-antenna assembly also includes an antenna integrated with and formed from the connector housing

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
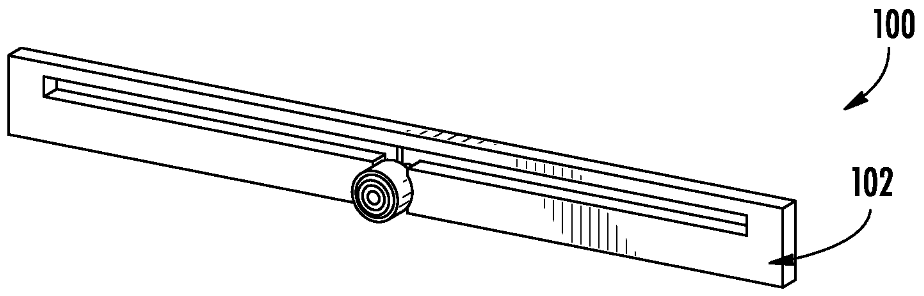
FIG. 1A shows a perspective view of a connector-antenna assembly in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to forming a connector-antenna assembly by monolithically integrating an antenna with a passive RF connector. In particular, the antenna is monolithically integrated with the RF connector housing. In some embodiments, the connector-antenna assembly may also monolithically integrate the RF signal element. The connector-antenna assembly thus eliminates the need for mechanical connections between the RF connector and antenna.

Figure 1B:
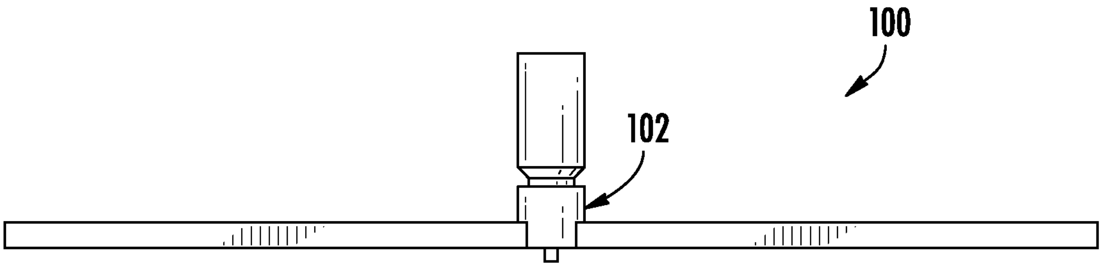
FIG. 1B shows a top view of the connector-antenna assembly of FIG. 1 in accordance with some embodiments.
Figure 4:
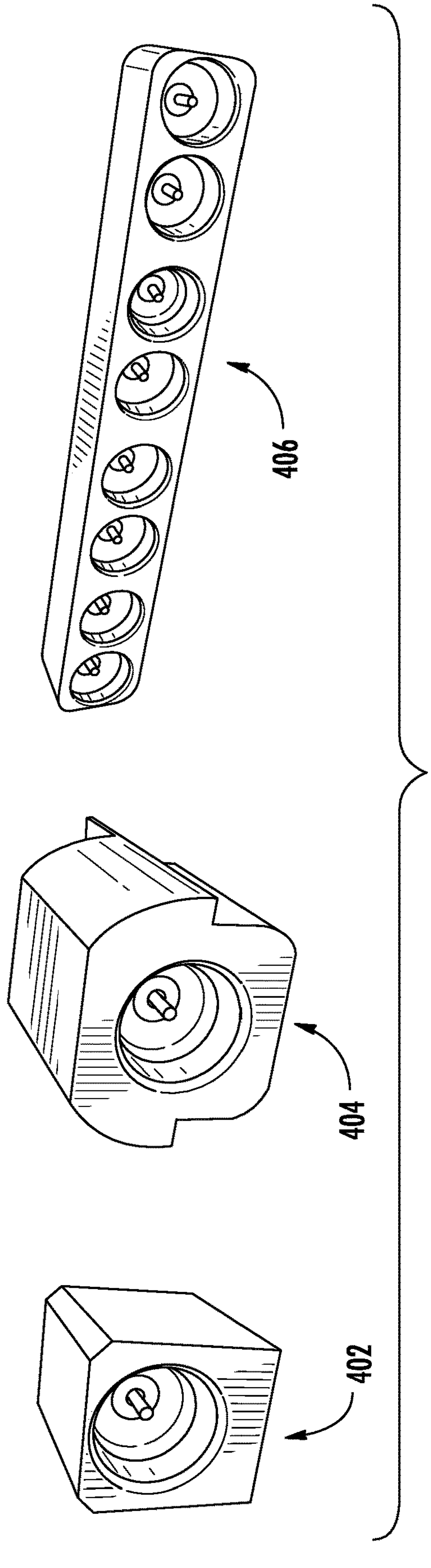
FIG. 4 shows current push-in connectors that may be modified to form the connector-antenna assembly in accordance with some embodiments.

FIG. 1A shows a perspective view of a connector-antenna assembly 100 and FIG. 1B shows a top view of connector-antenna assembly 100 in accordance with some embodiments. Connector-antenna assembly 100 includes an extended connector housing 102, the length of which may be determined based on the antenna form-factor, which determines the antenna functionality. Connector housing 102 may be, for example, a modified version of the outer housing of a push-on connector 402 or 404, shown in FIG. 4. In some embodiments, connector housing 102 may be a modified version of the outer housing of a special screw-on connector, wherein the nut of the screw connector is monolithic to the connector body.

In forming connector-antenna assembly 100, the extended housing of, for example, push-on connector 402 may be modified to form the antenna shown in FIGS. 1A and 1B. For example, the outer housing of push-on connector 402 may be extended on either side of the connector to create a three-dimensional metal block that is folded on top to form a dipole. Based on the antenna design, connector housing 102 may be modified to form closed slots, as shown if FIG. 1A.

To integrate connector-antenna assembly 100 with a PCB, connector-antenna assembly 100 may be configured to have opposite connector sex. For example, connector-antenna assembly 100 may be configured to mate to an opposite sex connector on a PCB or to an opposite sex-thru adapter, if mating to the same sex connector on the PCB. For example, if a male connector-antenna assembly 100 is to be connected to male PCB mount on the PCB, the connector-antenna assembly 100 may be configured for a blind-mate interconnect (female-female through connect) between the male connector-antenna assembly 100 and the male PCB mount.

In contrast to a soldered connection of an antenna to a printed circuit board (PCB), the push-on or screw-on connection of connector-antenna assembly 100 lends to easy and convenient conversion to a newer connector-antenna unit with different mmWave bands. This allows for manufacturing cost savings achieved by modular design flexibility at factories and for faster roll out of newer models.

Figure 2A:
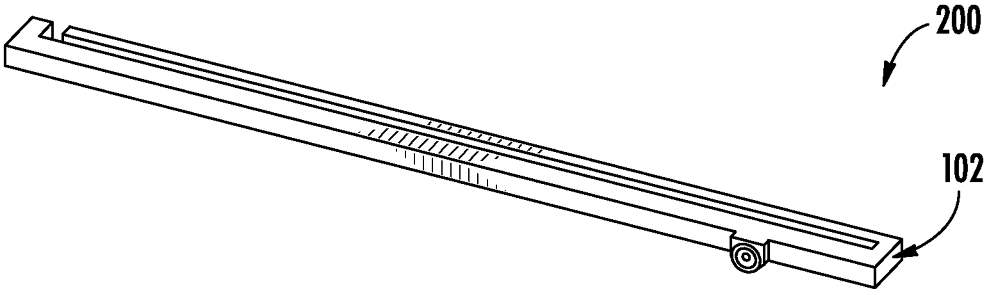
FIG. 2A shows a perspective view of another embodiment connector-antenna assembly in accordance with some embodiments.
Figure 2B:
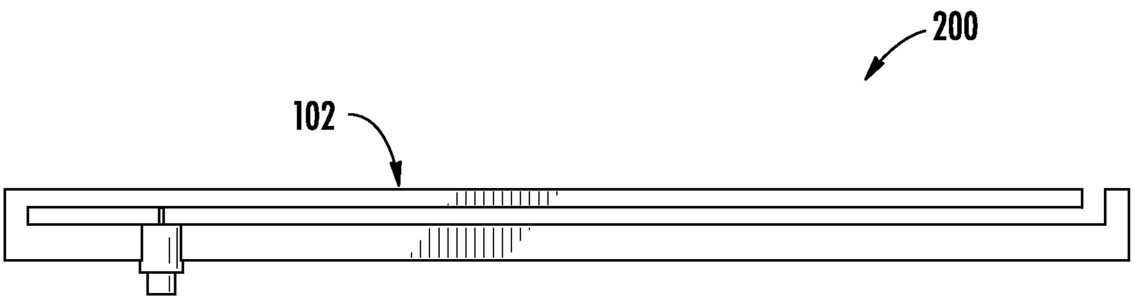
FIG. 2B shows a top view of the connector-antenna assembly of FIG. 2 in accordance with some embodiments.

FIG. 2A shows a perspective view of another connector-antenna assembly 200 and FIG. 2B shows a top view of connector-antenna assembly 200 in accordance with some embodiments. In forming connector-antenna assembly 200, the extended housing of, for example, push-on connector 404 may be modified to form a slot dipole antenna. Based on the antenna design, connector housing 102 of connector-antenna assembly 200 may be modified to form open slots.

Figure 3A:
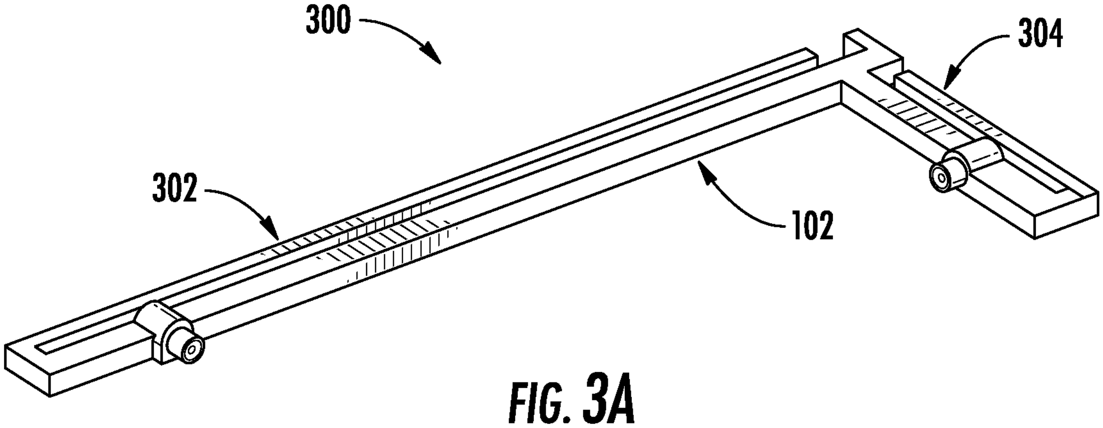
FIG. 3A shows a perspective view of a multi-connector and multi-antenna assembly in accordance with some embodiments.
Figure 3B:
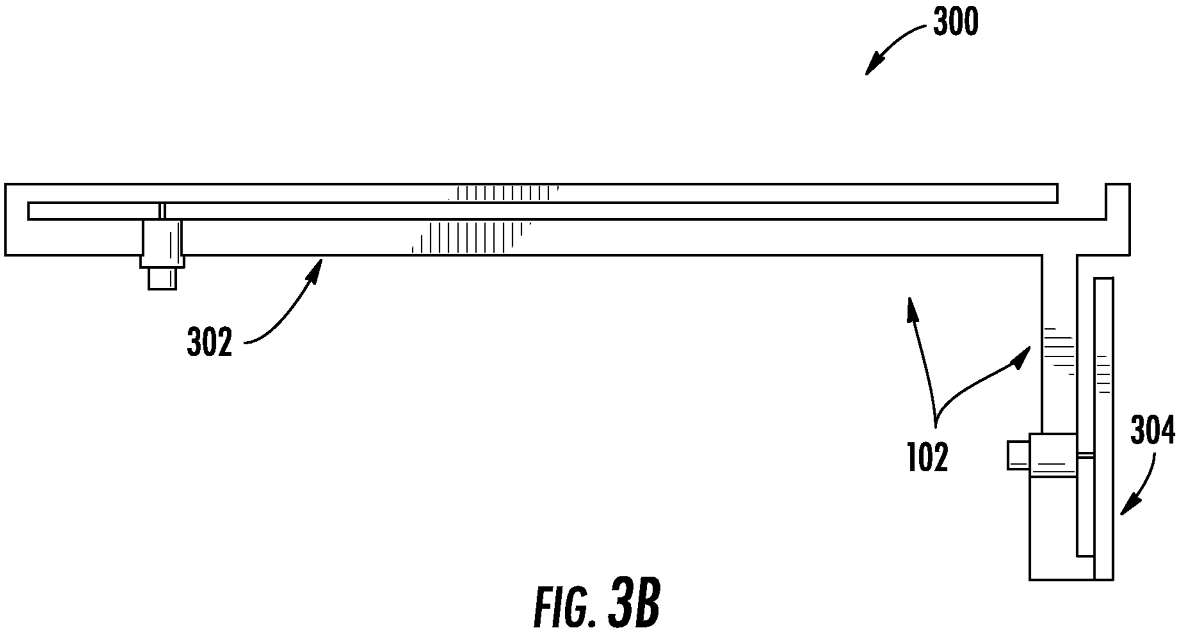
FIG. 3B shows a top view of the multi-connector and multi-antenna assembly in accordance with some embodiments.

FIG. 3A shows a perspective view of the multi-connector and multi-antenna assembly 300 and FIG. 3B shows a top view of the multi-connector-multi-antenna assembly 300 in accordance with some embodiments. In forming the multi-connector-multi-antenna assembly 300, the extended housing of a multi-position push-on connector, for example, push-on connector 406, may be configured to form two orthogonal slot dipole antennas 302 and 304. The extended housing of a multi-position push-on connector, for example, push-on connector 406, may also be configured to form two or more push-on connectors. Based on the antenna design, connector housing 102 of the multi-connector-multi-antenna assembly 300 may be modified to form open slots. Embodiments therefore allow for cost and performance advantages by multiplying elimination of a single connector and antenna junction over a multiple input multiple output (MIMO) platform.

In the embodiments shown in FIGS. 1A, 1B, 2A, 2B, 3A and 3B, a connector pin 104 may be designed to mechanically touch connector housing 102 to form a single monolithic connector housing, antenna, connector pin assembly. While such a condition may create a DC short condition, it is general knowledge that separation of charges at higher frequencies will still enable the function of the antenna and the connector as verified by the Voltage Standing Wave Ratio (VSWR) plots shown in FIGS. 1C, 2C and 3C. In other embodiments, the connector pin can be left isolated so as not to join the connector housing and antenna assembly.

Figure 1C:
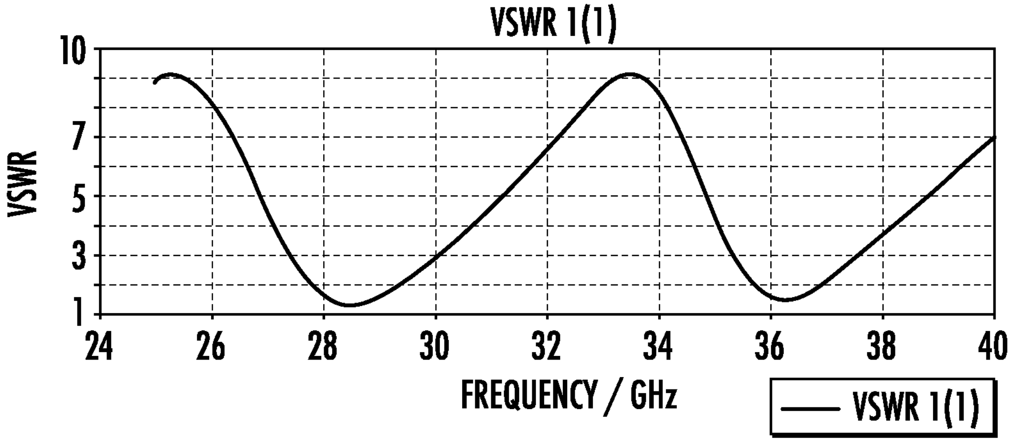
FIG. 1C shows a Voltage Standing Wave Ratio (VSWR) plot of the connector-antenna assembly of FIGS. 1A and 1B in accordance with some embodiments.
Figure 2C:
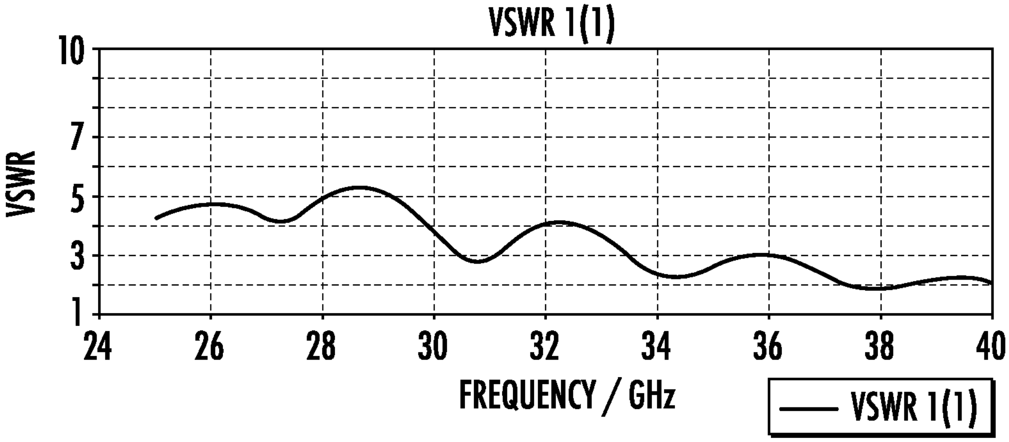
FIG. 2C shows a VSWR plot of the connector-antenna assembly of FIGS. 2A and 2B in accordance with some embodiments.
Figure 3C:
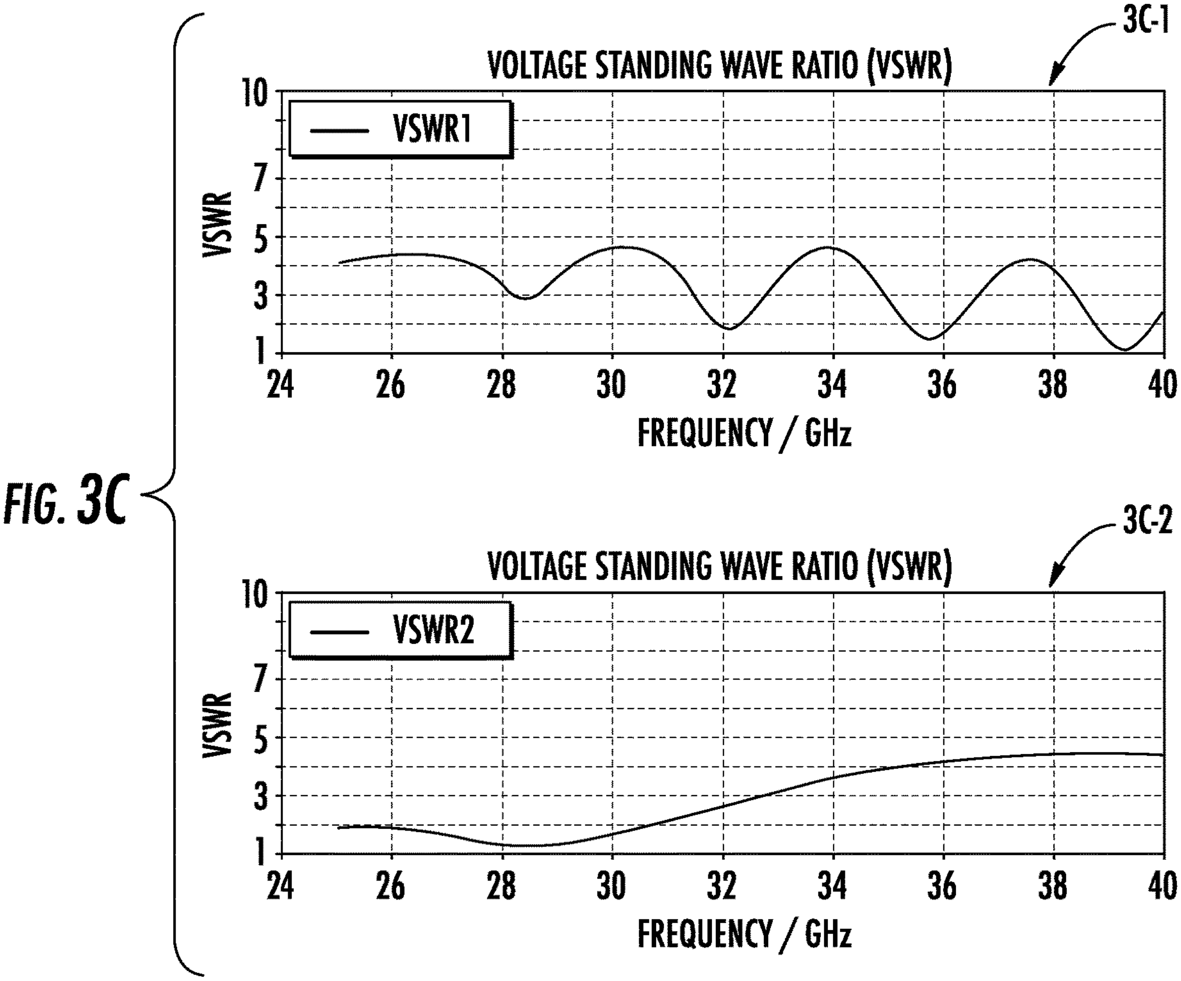
FIG. 3C shows VSWR plots of the multi-connector and multi-antenna assembly of FIGS. 3A and 3B in accordance with some embodiments.

FIG. 1C shows a VSWR plot of connector-antenna assembly 100 having resonance around the 28 GHz and 36 GHz bands. FIG. 2C shows a VSWR plot of connector-antenna assembly 200 having resonance around the 38 GHz band. FIG. 3C shows the VSWR plots of multi-connector and multi-antenna assembly 300, wherein 3C-1 shows the VSWR plot of connector-antenna assembly 302 and 3C-2 shows the VSWR plot of connector-antenna assembly 304. 3C-1 and 3C-2 showcase the MIMO capabilities of multi-connector and multi-antenna assembly 300 and show that embodiments can seamlessly allow for MIMO antenna technology which will be an integral aspect of fifth generation (5G) antenna design requiring use of mmWave bands up to 100 GHz.

Embodiments allow for monolithic integration of the RF connector housing to the antenna element in one design instance and, in another design instance, monolithic integration of the RF connector housing, the antenna element and the connector pin. Monolithic integration implies single or two metal fabrication runs versus three metal fabrication runs, directly contributing to time and cost savings. In some embodiments, the connector housing, antenna element and the connector pin of an integrated connector-antenna assembly may be fabricated in a single run, via, for example, fabrication techniques such as laser etching.

The connector-antenna assembly achieves dual functionality for both a commercial connector (wherein the antenna function is added to the already present connector function) and the commercial multi-position block (wherein multi-antenna function is added to the current multi-connector function).

An antenna designer may use space previously provided for the connector housing for an antenna constructed according to some embodiments. As such, the three-dimensional space previously provided for the connector housing becomes the raw-material used to carve out an antenna design. The three-dimensional space provides an avenue for designing more innovative, compact and complex antenna to meet the demanding needs of the 5G antenna functionality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A connector-antenna assembly, comprising:

a connector housing configured to function as a radio frequency connector, wherein a length of the connector housing is determined based on an antenna form factor; and an antenna integrated with and formed from the connector housing, wherein the connector housing is extended on a side of the connector to create a three-dimensional block, wherein the connector housing is shaped to form a slot dipole antenna.

2. The connector-antenna assembly of claim 1, wherein the connector housing forms open slots or closed slots.

3. The connector-antenna assembly of claim 1, wherein the connector housing is a modified push-on connector.

4. The connector-antenna assembly of claim 1, wherein the connector housing is a modified screw-on connector.

5. The connector-antenna assembly of claim 1, wherein the connector housing is configured to form more than one push-on connector.

6. The connector-antenna assembly of claim 5, wherein the connector housing is configured to form more than one antenna.

7. The connector-antenna assembly of claim 1, wherein the connector-antenna assembly is configured to have opposite connector sex.

8. The connector-antenna assembly of claim 1, wherein the connector-antenna assembly is configured to use space provided for the radio frequency connector and wherein the antenna is designed to fit in the space.

9. A connector-antenna assembly, comprising:

a connector housing monolithically integrated with a connector signal element and configured to function as a radio frequency connector, wherein a length of the connector housing is determined based on an antenna form factor; and an antenna monolithically integrated with and formed from the connector housing, wherein the connector housing is extended on a side of the connector to create a three-dimensional block, wherein the connector housing is shaped to form a slot dipole antenna.

10. The connector-antenna assembly of claim 9, wherein the connector housing forms open slots or closed slots.

11. The connector-antenna assembly of claim 9, wherein the connector housing is a modified push-on connector or a modified screw-on connector.

12. The connector-antenna assembly of claim 9, wherein the connector housing is configured for multiple push-on connectors and the connector housing is configured to form multiple antennas.

13. The connector-antenna assembly of claim 9, configured to have opposite connector sex.

14. The connector-antenna assembly of claim 9, wherein the connector-antenna assembly is configured to use space provided for the radio frequency connector and wherein the antenna is designed to fit in the space.

* * * * *